United States Patent
Hara

(10) Patent No.: US 9,896,370 B2
(45) Date of Patent: Feb. 20, 2018

(54) APPARATUS FOR HEAT TREATING AN OPTICAL CERAMIC MATERIAL, METHOD FOR HEAT TREATING AN OPTICAL CERAMIC MATERIAL, METHOD FOR HEAT TREATING SYNTHETIC SILICA GLASS, METHOD FOR PRODUCING AN OPTICAL SYSTEM, AND METHOD FOR PRODUCING AN EXPOSURE APPARATUS

(71) Applicant: NIKON CORPORATION, Tokyo (JP)

(72) Inventor: Yuta Hara, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 293 days.

(21) Appl. No.: 14/016,568

(22) Filed: Sep. 3, 2013

(65) Prior Publication Data

US 2014/0000090 A1 Jan. 2, 2014

Related U.S. Application Data

(63) Continuation of application No. PCT/JP2012/055350, filed on Mar. 2, 2012.

(30) Foreign Application Priority Data

Mar. 2, 2011 (JP) ................................. 2011-044763

(51) Int. Cl.
 *C03B 25/02* (2006.01)
 *C03B 29/02* (2006.01)
 (Continued)

(52) U.S. Cl.
 CPC .............. *C03B 25/02* (2013.01); *C03B 29/02* (2013.01); *C03B 32/02* (2013.01); *C04B 35/64* (2013.01);
 (Continued)

(58) Field of Classification Search
 CPC ....................................................... C03B 25/02
 See application file for complete search history.

(56) References Cited

U.S. PATENT DOCUMENTS 5,713,979 A * 2/1998 Nicholson ........... C03B 19/1453
 65/374.13
6,189,339 B1 * 2/2001 Hiraiwa .............. C03B 19/1415
 65/17.3
(Continued)

FOREIGN PATENT DOCUMENTS

CN   1426484 A   6/2003
DE   32 08 574 A1   9/1983
(Continued)

OTHER PUBLICATIONS

Apr. 3, 2012 International Search Report issued in International Application No. PCT/JP2012/055350.
(Continued)

*Primary Examiner* — Cynthia Szewczyk
(74) *Attorney, Agent, or Firm* — Oliff PLC

(57) ABSTRACT

An optical ceramic material heat treatment apparatus, comprising: a furnace body that is capable to contain an optical ceramic material to be heat treated in the inside thereof; a temperature drop control heater that generates heat during dropping a temperature of the optical ceramic material; a refrigerant intake unit that introduces a refrigerant into the inside of the furnace body to flow the refrigerant therein; and a control unit that controls the temperature drop rate, wherein the temperature drop control heater is arranged in the inside of the furnace body and/or in the refrigerant intake unit, the control unit controls at least one of an amount of heat generation of the temperature drop control heater, and a flow rate of the refrigerant in the inside of the furnace body to control a temperature drop rate at the optical ceramic (Continued)

material or in the vicinity thereof to be kept in a predetermined profile.

14 Claims, 10 Drawing Sheets

(51) Int. Cl.
*C03B 32/02* (2006.01)
*C04B 35/64* (2006.01)
*G02B 1/02* (2006.01)

(52) U.S. Cl.
CPC ............... *C04B 2235/6562* (2013.01); *C04B 2235/6565* (2013.01); *G02B 1/02* (2013.01); *Y10T 29/49826* (2015.01)

(56) References Cited

U.S. PATENT DOCUMENTS

| 6,732,546 | B1* | 5/2004 | Yajima | C03B 19/1453 65/111 |
| 2002/0050152 | A1* | 5/2002 | Fujiwara | C03B 19/1469 65/32.1 |
| 2004/0009448 | A1 | 1/2004 | Kisoda | |
| 2009/0095422 | A1 | 4/2009 | Sugishita et al. | |
| 2011/0130265 | A1* | 6/2011 | Mizuguchi | C03B 11/08 501/53 |

FOREIGN PATENT DOCUMENTS

| DE | 20 2009 015 849 U1 | 4/2010 |
| JP | H7-507034 A | 8/1995 |
| JP | H11-035329 A | 2/1999 |
| JP | A-2005-022921 | 1/2005 |
| JP | A-2009-298670 | 12/2009 |
| JP | A-2010-171383 | 8/2010 |
| WO | 93/23341 A1 | 11/1993 |
| WO | WO 2011/060761 A1 | 5/2011 |

OTHER PUBLICATIONS

Extended European Search Report issued in European Patent Application No. 12752504.6 dated Jul. 17, 2014.
Mar. 24, 2015 Office Action issued in Chinese Patent Application No. 201280011368.7.
Jun. 13, 2016 Office Action issued in European Application No. 12 752 504.6.
Nov. 24, 2016 Office Action issued in Chinese Patent Application No. 201280011368.7.
Feb. 14, 2017 Office Action issued in European Patent Application No. 12752504.6.
Nov. 16, 2015 2nd Notification of Office Action issued in Chinese Application No. 201280011368.7.
Dec. 1, 2015 Notification of Reason(s) for Refusual issued in Japanese Application No. 2013-502412.

* cited by examiner

APPARATUS FOR HEAT TREATING AN OPTICAL CERAMIC MATERIAL, METHOD FOR HEAT TREATING AN OPTICAL CERAMIC MATERIAL, METHOD FOR HEAT TREATING SYNTHETIC SILICA GLASS, METHOD FOR PRODUCING AN OPTICAL SYSTEM, AND METHOD FOR PRODUCING AN EXPOSURE APPARATUS

This continuation application claims the benefit of PCT/JP2012/055350 filed Mar. 2, 2012. This application also claims priority from Japanese Application No. 2011-044763 filed Mar. 2, 2011. The disclosures of the following priority applications are herein incorporated by reference:

Japanese Patent Application No. 2011-044763 (filed Mar. 2, 2011)

International Application No. PCT/JP2012/055350 (filed Mar. 2, 2012).

BACKGROUND OF THE INVENTION

1. Field of the Invention

The present invention relates to an apparatus for heat treating an optical ceramic material, a method for heat treating an optical ceramic material, a method for heat treating synthetic silica glass, a method for producing an optical system, and a method for producing an exposure apparatus.

2. Description of Related Art

As shorter wavelengths are increasingly used as a light source of an exposure apparatus, very high optical transmittance in such shorter wavelength light is needed for optical ceramic materials such as synthetic silica glass, calcium fluoride, barium fluoride and the like that are used in optical components constituting the optical system in the exposure apparatus. Optical ceramic materials that require such high optical transmittance is produced from a chemically synthesized raw material having high purity.

However, in the inside of the produced optical ceramic material, there remain various stresses derived from thermal history when it is produced. Accordingly, in order to reduce the stresses, a heat treatment called annealing treatment is performed to improve the homogeneity of refractive index by decreasing residual stresses and to decrease birefringence of the produced optical ceramic material (see Japanese Laid-open Patent Publication No. 2005-22921).

SUMMARY OF THE INVENTION

By combining a plurality of optical components obtained by processing the optical ceramic material as described above such that their birefringence can cancel each other to configure an optical system of the exposure apparatus, the birefringence of the optical system as a whole can be decreased. However, to configure the optical system in this manner, an optical component (lens or the like) having large birefringence is necessary and hence it is necessary to use an optical ceramic material having large birefringence as a material for such an optical component.

The inventor of the present invention has found that in order to obtain an optical ceramic material having desired birefringence, it is necessary to keep the temperature drop rate at the time of heat treating the optical ceramic material in a predetermined profile and based on this finding, they made the present invention. That is, it is an object of the present invention to provide an apparatus and a method for heat treating an optical ceramic material which apparatus and method can produce an optical ceramic material having a large birefringence value and showing a small error with respect to a predetermined birefringence value.

Also, it is an object of the present invention to provide a method for treating synthetic silica glass which method can produce synthetic silica glass having a large birefringence value and showing a small error for a predetermined birefringence value.

Also, it is an object of the present invention to provide a method for producing an optical system using the optical component obtained by processing the synthetic silica glass material that is produced according to the method for heat treating the synthetic silica glass.

Also, it is an object of the present invention to provide a method for producing an exposure apparatus, which method comprises producing an illumination optical system and/or a projection optical system by the above described method for producing an optical system and embedding it (them) to the exposure apparatus.

According to the first aspect of the present invention, an optical ceramic material heat treatment apparatus, comprises: a furnace body that is capable to contain an optical ceramic material to be heat treated in the inside thereof; a temperature drop control heater that generates heat to control a temperature drop rate during dropping a temperature of the optical ceramic material to be heat treated; a refrigerant intake unit that introduces a refrigerant into the inside of the furnace body to flow the refrigerant therein; and a control unit that controls the temperature drop rate, wherein the temperature drop control heater is arranged in the inside of the furnace body and/or in the refrigerant intake unit, the control unit controls at least one of an amount of heat generation of the temperature drop control heater, and a flow rate of the refrigerant in the inside of the furnace body to control a temperature drop rate at the optical ceramic material to be heat treated or in the vicinity thereof to be kept in a predetermined profile.

According to the second aspect of the present invention, in the optical ceramic material heat treatment apparatus of the first aspect, it is preferred that, the control unit controls both the amount of heat generation of the temperature drop control heater and the flow rate of the refrigerant in the inside of the furnace body.

According to the third aspect of the present invention, in the optical ceramic material heat treatment apparatus of the first or second aspect, it is preferred that, the optical ceramic material heat treatment apparatus further comprises a flow rate control unit that controls the flow rate of the refrigerant that flows in the inside of the furnace body.

According to the fourth aspect of the present invention, in the optical ceramic material heat treatment apparatus of any one of the first to third aspects, it is preferred that, the temperature drop control heater is provided in the inside of the furnace body and is used also as a temperature rise heater during rising the temperature of the optical ceramic material to be heat treated.

According to the fifth aspect of the present invention, in the optical ceramic material heat treatment apparatus of any one of the first to third aspects, it is preferred that, the temperature drop control heater is provided in the refrigerant intake unit and a temperature rise heater for rising the temperature of the optical ceramic material to be heat treated is provided in the furnace body.

According to the sixth aspect of the present invention, in the optical ceramic material heat treatment apparatus of any one of the first to third aspects, it is preferred that, the furnace body comprises a first furnace body and a second furnace body that are arranged in contact with each other in a vertical direction or in a horizontal direction, the temperature drop control heater is provided in the inside of the second furnace body, the refrigerant intake unit is installed to the second furnace body, the temperature rise heater is provided in the inside of the first furnace body, and in the inside of the first furnace body, a heater for rising the temperature of the optical ceramic material to be heat treated is provided.

According to the seventh aspect of the present invention, in the optical ceramic material heat treatment apparatus of the fifth aspect, it is preferred that, the furnace body comprises a first furnace body and a second furnace body that are arranged in contact with each other in a vertical direction or in a horizontal direction, the refrigerant intake unit is installed to the second furnace body, and the temperature rise heater is provided in the inside of the first furnace body.

According to the eighth aspect of the present invention, in the optical ceramic material heat treatment apparatus of any one of the first to fifth aspects, it is preferred that, the optical ceramic material heat treatment apparatus further comprises a wall portion that partitions the inside of the furnace body into an inner space and an outer space, wherein the optical ceramic material to be heat treated is arranged in the inner space.

According to the ninth aspect of the present invention, in the optical ceramic material heat treatment apparatus of the sixth or seventh aspect, it is preferred that, the optical ceramic material heat treatment apparatus further comprises a wall portion that partitions the inside of the second furnace body into an inner space and an outer space, wherein the optical ceramic material to be heat treated is arranged in the inner space.

According to the tenth aspect of the present invention, in the optical ceramic material heat treatment apparatus of the eighth or ninth aspect, it is preferred that, the temperature drop control heater is arranged in the inner space.

According to the eleventh aspect of the present invention, in the optical ceramic material heat treatment apparatus of the eighth or ninth aspect, it is preferred that, the wall portion extends in a substantially vertical direction.

According to the twelfth aspect of the present invention, in the optical ceramic material heat treatment apparatus of any one of the first to eleventh aspects, it is preferred that, the refrigerant is one of air, nitrogen gas, and inert gas, or a mixture of two or more among air, nitrogen gas, and inert gas.

According to the thirteenth aspect of the present invention, in the optical ceramic material heat treatment apparatus of any one of the first to eleventh aspects, it is preferred that, the refrigerant is a liquid.

According to the fourteenth aspect of the present invention, in the optical ceramic material heat treatment apparatus of the eighth or ninth aspect, it is preferred that, the refrigerant intake unit is arranged in the lower part of the furnace body.

According to the fifteenth aspect of the present invention, in the optical ceramic material heat treatment apparatus of any one of the first to eleventh aspects, it is preferred that, the optical ceramic material comprises an amorphous material or a single crystal material.

According to the sixteenth aspect of the present invention, in the optical ceramic material heat treatment apparatus of the fifteenth aspect, it is preferred that, the amorphous material comprises a synthetic silica glass.

According to the seventeenth aspect of the present invention, an optical ceramic material heat treatment method using the optical ceramic material heat treatment apparatus of any one of first to fourteenth aspects, the method comprises: heating an optical ceramic material to be heat treated to a predetermined temperature in a first temperature range and holding at the first temperature range for a predetermined time; and performing heat treatment by cooling the heated optical ceramic material at a temperature drop rate larger than a predetermined temperature drop rate.

According to the eighteenth aspect of the present invention, an optical ceramic material heat treatment method using the optical ceramic material heat treatment apparatus of the sixteenth aspect, the method comprises: heating an optical ceramic material to be heat treated to a predetermined temperature between 1000° C. and 1200° C. and holding the optical ceramic material at the predetermined temperature for a predetermined time, and performing heat treatment by cooling the heated optical ceramic material at a temperature drop rate larger than 70° C./hour.

According to the nineteenth aspect of the present invention, in the optical ceramic material heat treatment method of the eighteenth aspect, it is preferred that, a synthetic silica glass has a maximum value of birefringence of 5 nm/cm or more.

According to the twentieth aspect of the present invention, a production method for producing an optical system, the method comprises: providing a synthetic silica glass having a maximum value of birefringence of 5 nm/cm or more by the heat treatment method for heat treating the synthetic silica glass of the nineteenth aspect; processing the heat treated synthetic silica glass to obtain an optical component; and constituting an optical system including a plurality of optical components that include the obtained optical component.

According to the twenty-first aspect of the present invention, a production method for producing an exposure apparatus, the method comprises: producing an illumination optical system and/or a projection optical system by the production method for producing an optical system of the twentieth aspect; and incorporating the produced illumination optical system and/or the produced projection optical system to constitute the exposure apparatus.

DESCRIPTION OF PREFERRED EMBODIMENTS

[First Embodiment: Heat Treatment Apparatus]

Hereafter, a first embodiment for carrying out the present invention is explained with reference to the attached drawings. Note that the optical ceramic material to be heat treated is explained taking as an example synthetic silica glass. However, optical ceramic materials other than the synthetic silica glass can be treated similarly.

(Embodiment 1-1)

Figure 1:
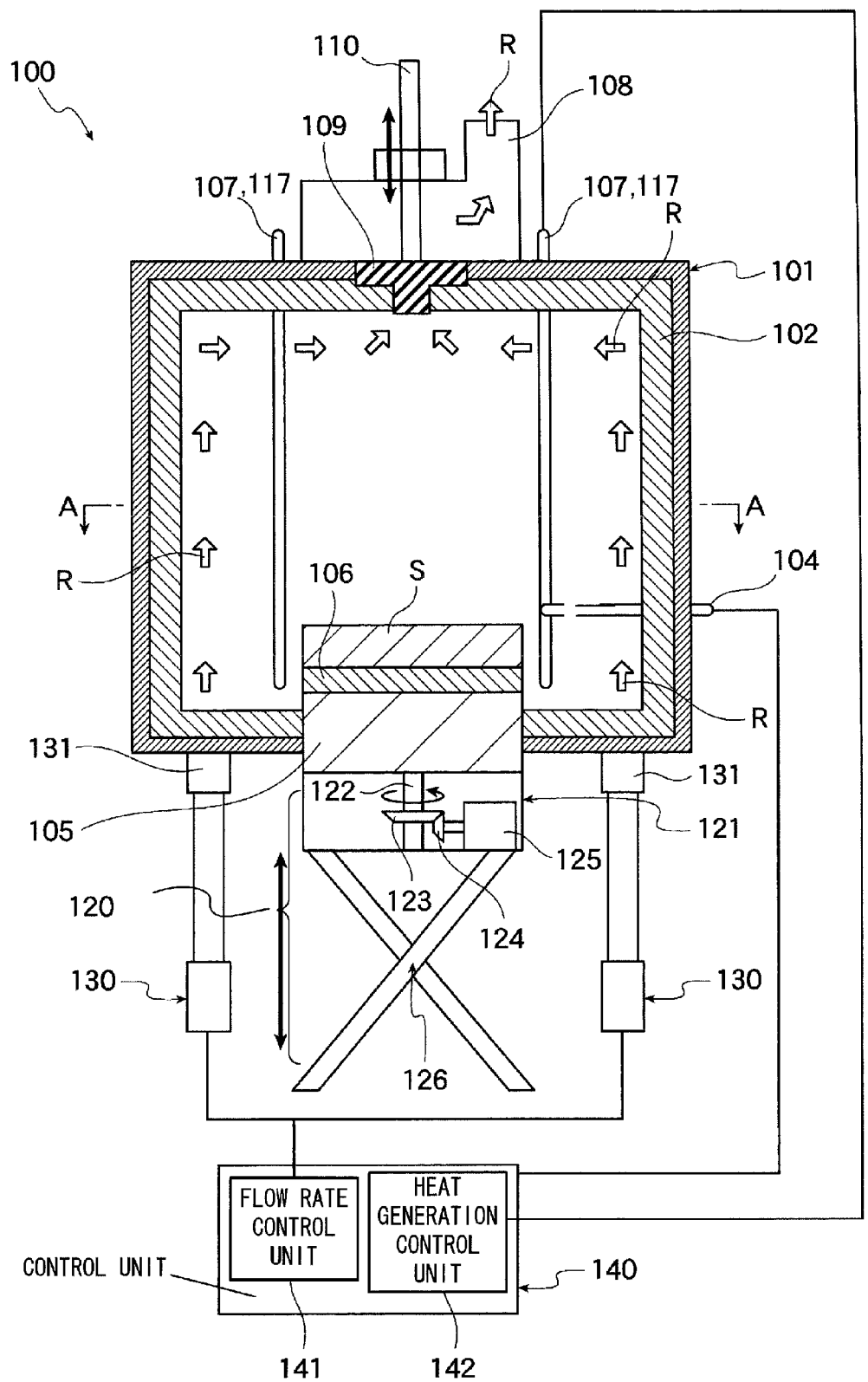
FIG. 1 is a cross-sectional view showing an optical ceramic material heat treatment apparatus according to Embodiment 1-1 of the present invention.
Figure 2:
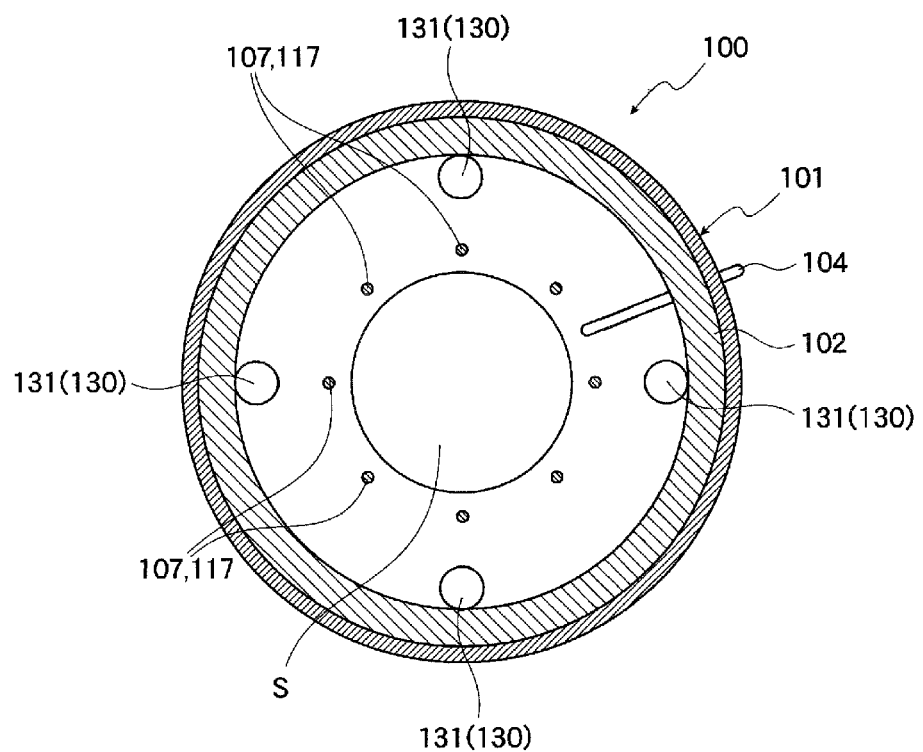
FIG. 2 is a cross-sectional view along line A-A in FIG. 1.

FIG. 1 is a cross-sectional view showing a heat treatment apparatus 100 according to Embodiment 1-1 of the present invention1. FIG. 2 is a cross-sectional view along line A-A in FIG. 1.

The heat treatment apparatus 100 according to the Embodiment 1-1 of the present invention1 performs heat treatment by heating the synthetic silica glass mass S produced by a vapor phase synthetic method to a predetermined temperature and holding the mass S at that temperature and then quenching it at a temperature drop rate larger than a predetermined temperature drop rate. Thereby, synthetic silica glass mass S having large birefringence is produced.

As shown in FIG. 1 and FIG. 2, the heat treatment apparatus 100 includes a furnace body 101. The outer wall of the heat treatment apparatus 100 is constituted by a stainless steel plate or the like and has an approximately cylindrical form. The furnace body 101 has an inner wall. Substantially the whole surface of the inner wall is covered by an heatproof material 102 constituted by alumina firebrick. This makes the temperature of the inside of the furnace body 101 from being hardly influenced by the temperature outside the furnace body 101. Note that the heat treatment apparatus according to the first embodiment is explained taking as an example the one having an inner diameter of about 1 m.

The heat treatment apparatus 100 includes a stage 105, which is made of firebrick, for arranging the synthetic silica glass mass S inside the furnace body 101 and a ring-formed jig 106 made of silica glass. Below the stage 105, there is arranged a stage movement device 120 having a rotation mechanism 121 and an elevation mechanism 126. With this configuration, the synthetic silica glass mass S to be heat treated, mounted on the ring-formed jig 106, which is provided on the stage 105, is arranged at an approximately central part of the inside of the furnace body 101.

In the stage movement device 120, the rotation mechanism 121 rotates the synthetic silica glass mass S while it is being heat treated. The rotation mechanism 121 includes a shaft 122 that rotates, a first bevel gear 123 fixed to the shaft 122, a second bevel gear 124 that engages with the first bevel gear 123, and a motor 125 that rotates the second bevel gear 124. The shaft 122 is fixed to a lower part of the stage 105 and extends downward. The shaft 122 rotates together with the stage 105. When the shaft of the motor 125 rotates, the shaft 122 and the stage 105 rotate in integration through the second bevel gear 124 and the first bevel gear 123. This causes the synthetic silica glass mass S arranged on the stage 105 to rotate.

In the stage movement device 120, an elevation mechanism 126 is constituted by a link mechanism. The elevation mechanism 126 moves the synthetic silica glass mass S that is mounted on the ring-formed jig 106 on the stage 105 upward to the inside of the furnace body 101 and moves it after completion of heat treatment downward to the outside of the furnace body 101.

In the inside of the furnace body 101 temperature rise heaters 107 for rising the temperature of the synthetic silica glass mass S are arranged. In the heat treatment apparatus according to the Embodiment 1-1, the temperature rise heaters 107 also function as a temperature drop control 117 for controlling the temperature drop rate during the temperature of the synthetic silica glass mass S is dropped. In the heat treatment apparatus according to the Embodiment 1-1, a SiC heaters are used as the temperature rise heaters 107 and the temperature drop control heaters. As shown in FIG. 2, eight (8) SiC heaters are arranged on a virtual cylindrical surface having a common center with the furnace body 101 at equal intervals.

In the lower part of the furnace body 101 refrigerant intake units 130 are provided for introducing a refrigerant such as air (outside air), nitrogen gas or inert gas, or mixtures thereof, to the inside space of the furnace body 101. The refrigerant intake units 130 introduce the refrigerant from outside of the heat treatment apparatus 100 or a refrigerant storage tank (not shown) or the like to the inside space of the furnace body 101 through the refrigerant intake valves 131. The refrigerant flows in the inside of the furnace body 101, for example, as indicated by an arrow R in FIG. 1. The introduction amount of the refrigerant can be controlled by adjusting the degree of opening of the refrigerant intake valves 131. Note that according to the Embodiment 1-1 of the present invention, as shown in FIG. 2, four refrigerant intake units 130 are arranged at equal intervals on a virtual circle at the bottom of the furnace body 101 having a common center with the furnace body 101 to introduce outside air as refrigerant from outside of the heat treatment apparatus 100.

The refrigerant introduce from the refrigerant intake units 130 flows upwards in the inside of the furnace body 101 and then released to the outside of the furnace body 101 through the refrigerant release port 108 provided on the top of the furnace body 101. In a flow path leading from the inside of the furnace body 101 to the refrigerant release port 108 a refrigerant release valve 109, that is fixed to a lower end of a rod-like member 110 movable up and down, is provided. Based on the degree of opening of the refrigerant release valve 109, the discharge amount of the refrigerant can be adjusted. When the refrigerant release valve 109 is in an open state, the refrigerant is released along the direction indicated by the arrow R in FIG. 1. In the heat treatment apparatus according to the Embodiment 1-1 of the present invention, the flow rate of the refrigerant that flows in the inside of the furnace body 101 is adjusted by controlling the refrigerant intake valves 131 and refrigerant release valve 109 as linked with each other.

The heat treatment apparatus 100 includes a thermocouple 104 that detects a temperature in the vicinity of the synthetic silica glass mass S. The apical end of the thermocouple 104 is arranged so as to reach the vicinity of the synthetic silica glass mass S disposed in the inside of the furnace body 101. The heat treatment apparatus 100 includes a control unit 140 at the outside of the furnace body 101. The control unit 140 includes a flow rate control unit 141 that controls the flow rate of the refrigerant that flows in the inside of the furnace body 101 and a heat generation control unit 142 that controls the amount of heat generation by the temperature drop control heaters 117. The control unit 140 outputs control signal to at least one of the flow rate control unit 141 and the heat generation control unit 142 based on the temperature of the vicinity of the synthetic silica glass mass S detected by the thermocouple 104. Based on it, at least one of, the degree of opening of the refrigerant intake valves 131 and/or the degree of opening of the refrigerant release valve 109 (that is, the flow rate of the refrigerant), and the amount of heat generation of the temperature drop control heaters 117 is controlled to keep the temperature drop rate of the synthetic silica glass mass S in a predetermined profile.

Note that to more accurately control the temperature drop rate of the synthetic silica glass mass S, it is preferred that the control unit 140 control both the flow rate control unit 141 and the heat generation control unit 142 to adjust the flow rate of the refrigerant and the amount of heat generation by the temperature drop control heaters 117 simultaneously.

(Embodiment 1-2)

Figure 3:
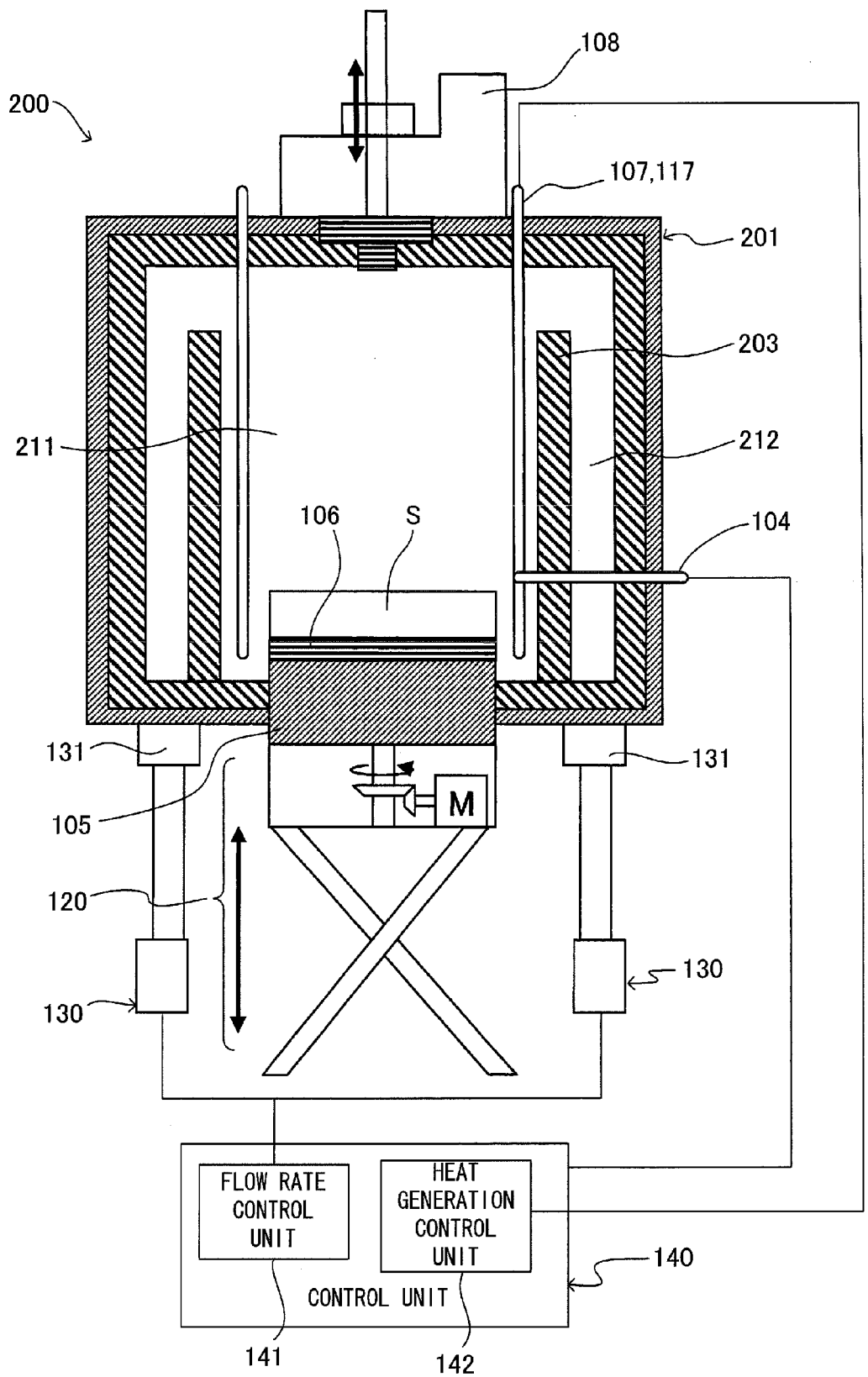
FIG. 3 is a cross-sectional view showing an optical ceramic material heat treatment apparatus according to Embodiment 1-2 of the present invention.

Then, an optical ceramic material heat treatment apparatus according to Embodiment 1-2 of the present invention is explained with reference to the attached drawings. FIG. 3 is a cross-sectional view showing an optical ceramic material heat treatment apparatus according to the Embodiment 1-2 of the present invention. Note that the constituents which are the same as those of the optical ceramic material heat treatment apparatus 100 according to the Embodiment 1-1 are assigned the same reference numerals as those used in FIG. 1.

The optical ceramic material heat treatment apparatus 200 differs from the optical ceramic material heat treatment apparatus 100 according to the Embodiment 1-1 in that a wall portion 203 extending in a vertical direction is provided at the bottom wall such that the inside of the furnace body 201 is partitioned into an inner space 211 and an outer space 212. The wall portion 203 has a height of about 100 mm and is made of glass fiber refractory that includes silica glass fiber or the like. The inner space 211 and the outer space 212 communicate with each other on the upper part of the wall portion 203. Also, heat is conducted between the inner space 211 and the outer space 212 through the wall portion 203.

The synthetic silica glass mass S is mounted on the ring-formed jig 105 on the stage 105 and is arranged by the stage movement device 120 at an approximately central part of the inner space 211 inside the furnace body 201. Inside the inner space 211, eight temperature rise heaters 107 for rising the temperature of the synthetic silica glass mass S are arranged at equal intervals on a virtual cylindrical surface having a common center with the furnace body 201. In the same manner as that in the optical ceramic material heat treatment apparatus 100 according to the Embodiment 1-1, the temperature rise heater 107 also functions as the temperature drop control heater 117 for controlling the temperature drop rate during the temperature of the synthetic silica glass is decreased.

In the heat optical ceramic material heat treatment apparatus 200, like the optical ceramic material heat treatment apparatus 100 according to the Embodiment 1-1, four refrigerant intake units 130 are provided at equal intervals on a virtual circle having a common center with the furnace body 201 on the lower part of the outer space 212. Refrigerant such as, air (outside air), nitrogen gas or inert gas, or mixtures thereof or the like is introduced from the refrigerant intake units 130 into the inside of the furnace body 201.

The refrigerant that is introduced by the refrigerant intake units 130 into the inside of the furnace body 201 flows in the outer space 212 and is released through the refrigerant release port 108 provided on the upper part of the furnace body 201. The method of adjusting the introduction amount of the refrigerant is the same as in the method used in the optical ceramic material heat treatment apparatus 100 according to the Embodiment 1-1.

The optical ceramic material heat treatment apparatus 200 includes a thermocouple 104. The apical end of the thermocouple 104 is arranged so as to reach the vicinity of the synthetic silica glass mass S arranged in the inside of the inner space 211 of the furnace body 201.

The optical ceramic material heat treatment apparatus 200, like the optical ceramic material heat treatment apparatus 100 according to the Embodiment 1-1, includes a flow rate control unit 141 for controlling the flow rate of the refrigerant that flows in the inside of the furnace body 201 and a heat generation control unit 142 for controlling the amount of heat generation of the temperature drop control heaters 117. The control unit 140 outputs control signal to at least one of the flow rate control unit 141 and the heat generation control unit 142 based on the temperature in the vicinity of the synthetic silica glass mass S detected by the thermocouple 104. Based on it, at least one of, the degree of opening of the refrigerant intake valves 131 and/or the degree of opening of the refrigerant release valve 109 (that is, the flow rate of the refrigerant), and the amount of heat generation of the temperature drop control heaters 117 is adjusted to keep the temperature drop rate of the synthetic silica glass mass S in a predetermined profile.

In the optical ceramic material heat treatment apparatus 200, the wall portion 203 is provided. This prevents the refrigerant introduced from the refrigerant intake units 130 from directly winding the synthetic silica glass mass S. Heat of the synthetic silica glass mass S is conducted to the wall portion 203 through the inner space 211 and is further conducted to the outer space 212 through the inside of the wall portion 203 and then is discharged with the refrigerant to the outside of the furnace body 201. By this operation, control of temperature drop of the synthetic silica glass mass S can be performed more accurately.

Note that to more accurately control the temperature drop rate of the synthetic silica glass mass S, it is preferred that the control unit 140 controls both the flow rate control unit 41 and the heat generation control unit 142, that is, the control unit 140 controls the flow rate of the refrigerant and the amount of heat generation of the temperature drop control heaters 117 simultaneously.

(Embodiment 1-3)

Figure 4:
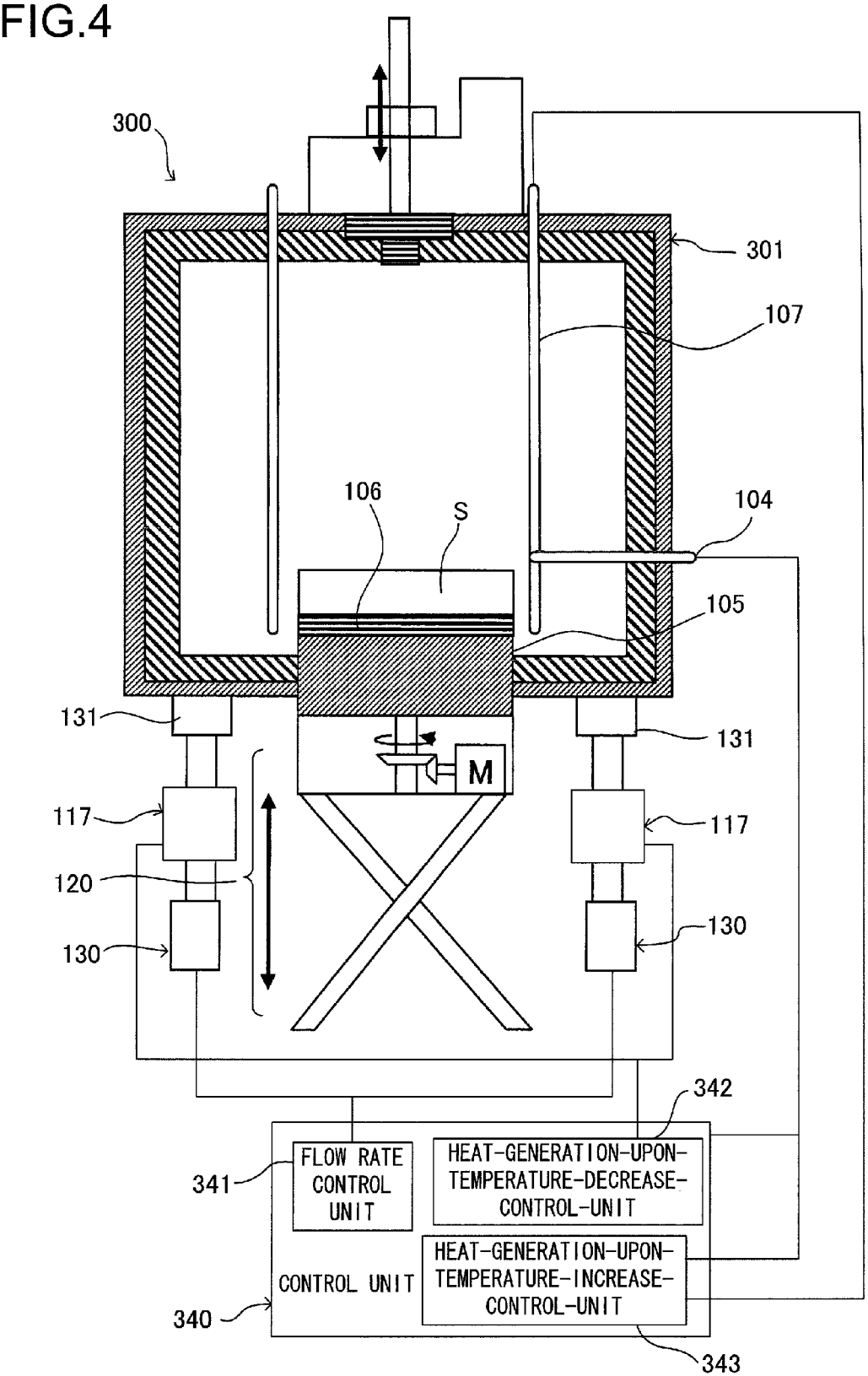
FIG. 4 is a cross-sectional view showing an optical ceramic material heat treatment apparatus according to Embodiment 1-3 of the present invention.

Then, an optical ceramic material heat treatment apparatus according to Embodiment 1-3 of the present invention is explained with reference to the attached drawings. FIG. 4 is a cross-sectional view showing an optical ceramic material heat treatment apparatus 300 according to the Embodiment 1-3 of the present invention. Note that the constituents which are the same as those of the optical ceramic material heat treatment apparatus 100 according to the Embodiment 1-1 are assigned the same reference numerals as those used in FIG. 1.

The optical ceramic material heat treatment apparatus 300 differs from the optical ceramic material heat treatment apparatus 100 according to the Embodiment 1-1 in that the refrigerant intake unit that introduces a refrigerant includes a temperature drop control heaters 117. Therefore, in the optical ceramic material heat treatment apparatus 300, the temperature rise heaters 107 function only during the temperature of the synthetic silica glass rises but do not function during the temperature of the synthetic silica glass is dropped. That is, the temperature rise heaters 107 do not function as a temperature drop control heaters.

The synthetic silica glass mass S is mounted on the ring-formed jig 105 on the stage 105 and then is arranged at an approximately central part of the inside of the furnace body 301 by the stage movement device 120. In the inside of the furnace body 301, eight temperature rise heaters 107 for rising the temperature of the synthetic silica glass mass S are arranged at equal intervals on a virtual cylindrical surface having a common center with the furnace body 301.

Four refrigerant intake units 130 are provided at equal intervals on a virtual circle at the bottom of the furnace body 301 having a common center with the furnace body 301. In each of the refrigerant intake units 130 the temperature drop control heaters 117 are provided as explained above. In the optical ceramic material heat treatment apparatus 300 according to the Embodiment 1-3, the temperature drop control heaters 117 are provided on an upstream side of the refrigerant intake valves 131. The location of the temperature drop control heaters 117 may be anywhere so far as it is on the upstream side of the furnace body 301. For example, it may be between the refrigerant intake valves 131 and the furnace body 301. Refrigerant such as, air (outside air), nitrogen gas or inert gas, or mixtures thereof or the like is introduced from the refrigerant intake units 130 into the inside of the furnace body 301. On this occasion, the refrigerant is heated by the temperature drop control heaters 117 and then introduced into the inside of the furnace body 301. Note that the method of adjusting the introduction amount of the refrigerant is the same as in the optical ceramic material heat treatment method used in the optical ceramic material heat treatment apparatus 100 according to the Embodiment 1-1.

The optical ceramic material heat treatment apparatus 300 includes a thermocouple 104. The apical end of thermocouple 104 is arranged so as to reach the vicinity of the synthetic silica glass mass S.

The optical ceramic material heat treatment apparatus 300 includes a control unit 340. The control unit 340 includes a heat-generation-upon-temperature-rise-control-unit 343 that controls the amount of heat generation of the temperature rise heaters 107, a flow rate control unit 341 that controls the flow rate of the refrigerant that flows in the inside of the furnace body 301, and a heat-generation-upon-temperature-drop-control-unit 342 that controls the amount of heat generation of the temperature drop control heaters 117. The control unit 340 outputs control signal to at least one of the flow rate control unit 341 and the heat-generation-upon-temperature-drop-control unit 342 based on the temperature of the vicinity of the synthetic silica glass mass S detected by the thermocouple 104. Based on it, at least one of the degree of opening of the refrigerant intake valves 131 and/or refrigerant release valve 109 (that is, the flow rate of the refrigerant) and the amount of heat generation of the temperature drop control heaters 117 is controlled to keep the temperature drop rate of the synthetic silica glass mass S in a predetermined profile.

In the optical ceramic material heat treatment apparatus 300, control of temperature drop rate of the synthetic silica glass mass S is performed by controlling at least one of the heating of the refrigerant and the flow rate of the refrigerant. This makes it possible to accurately control temperature drop of the synthetic silica glass mass S.

Note that to more accurately control the temperature drop rate of the synthetic silica glass mass S, it is preferred that the control unit 340 controls both the flow rate control unit 341 and the heat-generation-upon-temperature-drop-control-unit 342, that is, the control unit 340 controls the flow rate of the refrigerant and the amount of heat generation of the temperature drop control heaters 117 simultaneously.

Figure 5:
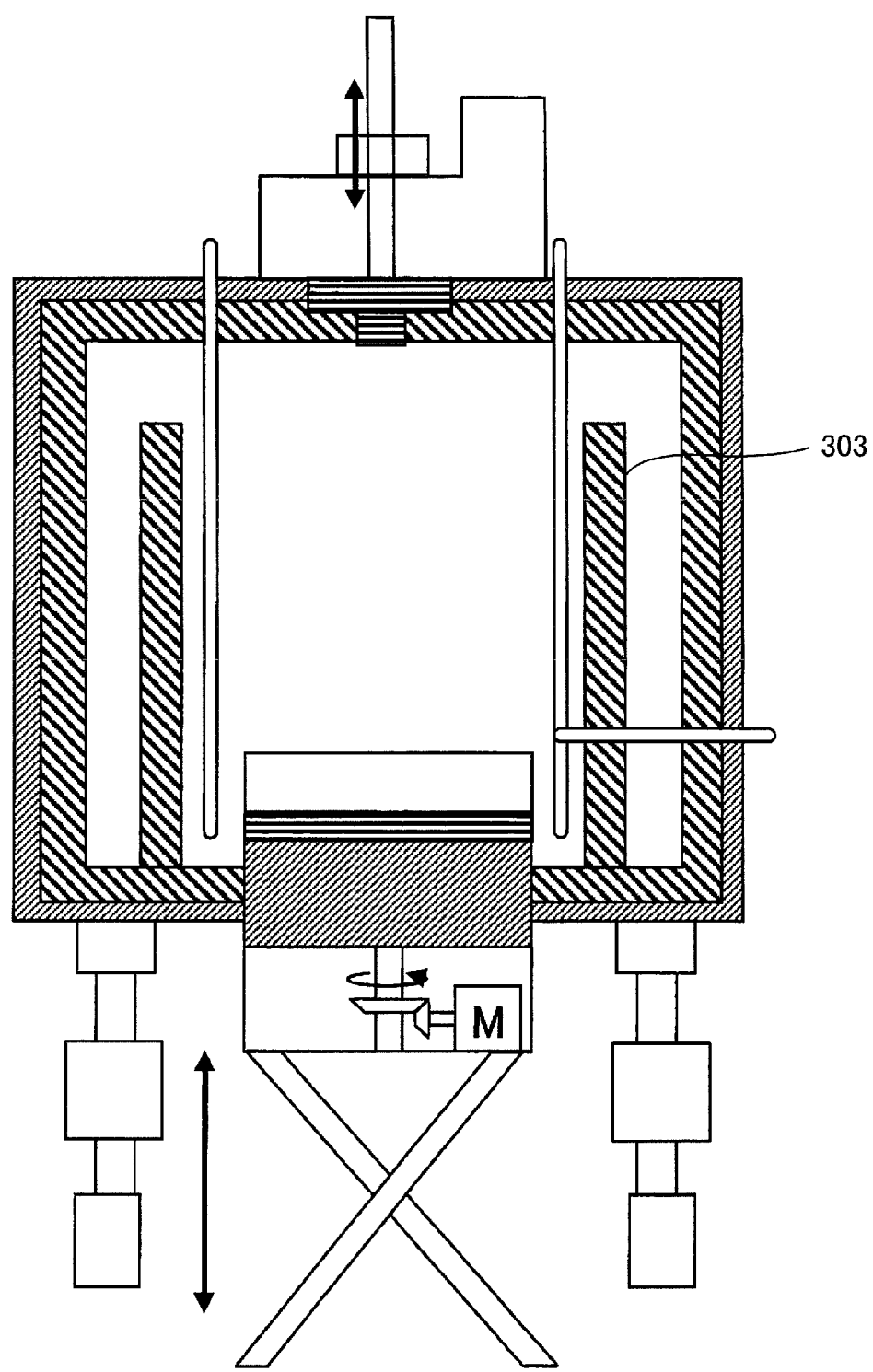
FIG. 5 is a cross-sectional view showing another configuration of an optical ceramic material heat treatment apparatus according to Embodiment 1-3 of the present invention.

Also, a configuration may be adopted in which a wall portion 303 is provided inside the furnace body 302 of the optical ceramic material heat treatment apparatus 300, The wall portion 303 is similar to the wall portion 203 in the optical ceramic material heat treatment apparatus 200 according to the Embodiment 1-2. This configuration is shown in FIG. 5. By adopting this configuration, similarly to the case of the optical ceramic material heat treatment apparatus 200 according to the Embodiment 1-2, the refrigerant introduced from the refrigerant intake units 130 is prevented from directly winding the synthetic silica glass mass S, so that the temperature drop of the synthetic silica glass mass S can be controlled more accurately.

Embodiment 1-4)

Then, an optical ceramic material heat treatment apparatus according to

Figure 6:
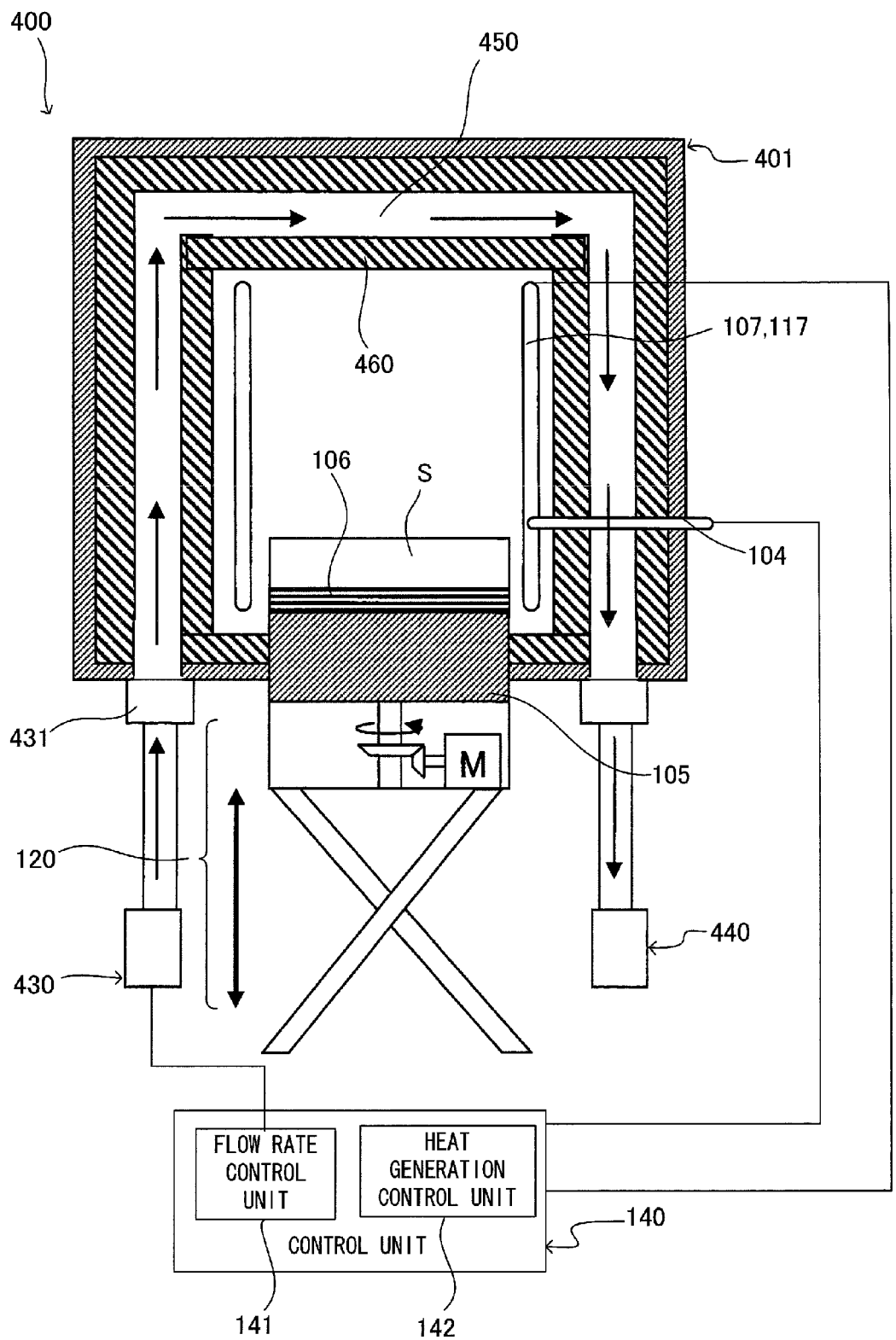
FIG. 6 is a cross-sectional view showing an optical ceramic material heat treatment apparatus according to Embodiment 1-4 of the present invention.

Embodiment 1-4 of the present invention is explained with reference to the attached drawings. FIG. 6 is a cross-sectional view showing an optical ceramic material heat treatment apparatus 400 according to a fourth configuration mode in the first aspect of the present invention. Note that the constituents which are the same as those of the optical ceramic material heat treatment apparatus 100 according to the Embodiment 1-1 are assigned the same reference numerals as those used in FIG. 1.

The optical ceramic material heat treatment apparatus 400 uses water as the refrigerant. For this purpose, the furnace body 401 is provided with a refrigerant intake unit 430, a refrigerant release unit 440, and a piping 450 that connects these units, inside of the furnace body 401. The refrigerant is introduced from the refrigerant intake unit 430 and flows in the piping in the inside of the furnace body 401. Then, it is released to the outside of the furnace body 401 from the refrigerant release unit 440. The refrigerant intake unit 430 is provided with refrigerant intake valves 431. Based on the degree of opening thereof, the introduction amount of the refrigerant is adjusted. The circumference of the piping 450 is covered with glass fiber refractory 460 that includes silica glass fiber or the like. The refrigerant intake units 430 and the refrigerant release units 440 are provided on the lower part of the furnace body 401 such that two each of them in total four are arranged at equal intervals on a virtual circle.

The configuration of the furnace body 401 other than the above configuration is the same as that of the optical ceramic material heat treatment apparatus 100 according to the Embodiment 1-1. That is, the furnace body 401 has an outer wall that is constituted by a stainless steel plate and an inner wall that is covered with alumina firebrick substantially on the whole surface thereof. Also, the stage movement mechanism 120 is the same as that of the optical ceramic material heat treatment apparatus 100 according to the Embodiment 1-1.

The synthetic silica glass mass S is mounted on the ring-formed jig 106 on the stage 105 and is arranged at an approximately central part in the inside of the furnace body 401 by the stage movement device 120. In the inside of the piping 450 for the refrigerant, eight temperature rise heaters 107 for the temperature rise of silica glass are arranged at equal intervals on a virtual cylindrical surface having a common center with the furnace body 401. Similarly to the optical ceramic material heat treatment apparatus 100 according to the Embodiment 1-1, the temperature rise heaters 107 also function as the temperature drop control heaters 117 for controlling the temperature drop rate during dropping the temperature of the synthetic silica glass mass S.

The heat treatment apparatus 400 for optical ceramic material heat treatment apparatus includes a thermocouple 104. The thermocouple 104 has an apical end that is arranged so as to reach the vicinity of the synthetic silica glass mass arranged in the inside of the furnace body 401.

The optical ceramic material heat treatment apparatus 400, similarly to the optical ceramic material heat treatment apparatus 100 according to the Embodiment 1-1, includes a control unit 140 that has a flow rate control unit 141 that controls the flow rate of the refrigerant that flows in the inside of the furnace body 401 and a heat generation control unit 142 that controls the amount of heat generation by the temperature drop control heaters 117. The control unit 140 outputs control signal to at least one of the flow rate control unit 141 and the heat generation control unit 142 based on the temperature of the vicinity of the synthetic silica glass mass S detected by the thermocouple 104. Based on it, at least one of the degree of opening of the refrigerant intake valves 131 and the amount of heat generation of the temperature drop control heaters 117 is controlled to keep the temperature drop rate of the synthetic silica glass mass S in a predetermined profile.

In the optical ceramic material heat treatment apparatus 400, water is used as the refrigerant. This allows heat exchange to be performed efficiently, so that temperature drop of the synthetic silica glass can be controlled accurately. In addition to water, incombustible oil or a mixture thereof with appropriate additives may be used as the refrigerant.

Note that to more accurately control the temperature drop rate of the synthetic silica glass mass S, it is preferred that the control unit 140 control both the flow rate control unit 141 and the heat generation control unit 142 to adjust the flow rate of the refrigerant and the amount of heat generation by the temperature drop control heaters 117 simultaneously.

(Embodiment 1-5)

Figure 7:
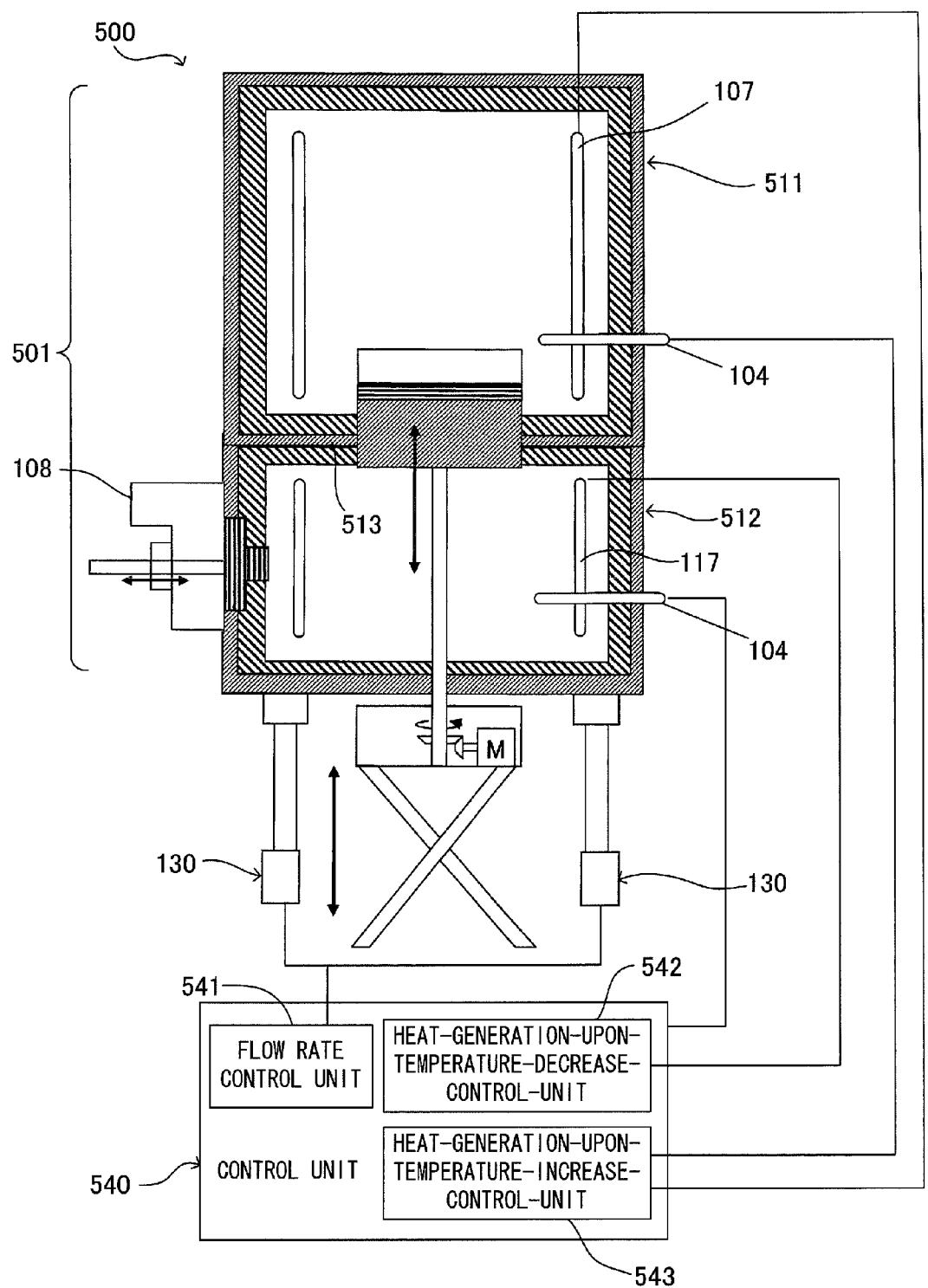
FIG. 7 is a cross-sectional view showing an optical ceramic material heat treatment apparatus according to Embodiment 1-5 of the present invention.

Then, an optical ceramic material heat treatment apparatus according to Embodiment 1-5 of the present invention is explained with reference to the attached drawings. FIG. 7 is a cross-sectional view showing the optical ceramic material heat treatment apparatus 500 according to embodiment 1-5 of the present invention. Note that the constituents which are the same as those of the optical ceramic material heat treatment apparatus 100 according to the Embodiment 1-1 are assigned the same reference numerals as those used in FIG. 1.

The optical ceramic material heat treatment apparatus 500 includes a furnace body 501 that has a first furnace body 511 and a second furnace body 512. The first furnace body 511 and the second furnace body 512 are tiered (laid one on another) in a vertical direction, and they are partitioned each other by a partition wall 513 provided therebetween. The partition wall 513 is provided with an openable and closable opening through which the stage can pass.

In the inside of the first furnace body 501, eight temperature rise heaters 107 are arranged at equal intervals on a virtual cylindrical surface having a common center with the furnace body 501. In the inside of the second furnace body 502, eight temperature drop control heaters 117 are arranged at equal intervals on a virtual cylindrical surface having a common center with the furnace body 501.

In the optical ceramic material heat treatment apparatus 500, four refrigerant intake units 130 are provided at equal intervals on the lower part of the second furnace body 502 on a virtual circle having a common center with the furnace body 501. A refrigerant such as air (outside air), nitrogen gas or inert gas, or mixtures thereof or the like is introduced from the s 130 into the inside of the furnace body 502.

The refrigerant that is introduced by the refrigerant intake units 130 into the inside of the furnace body 502 flows in the inside of the second furnace body 502 and is released through the refrigerant release port 108 that is provided on a relatively upper part of the second furnace body 502. The method of adjusting the introduction amount of the refrigerant is the same as that in the method used in the optical ceramic material heat treatment apparatus 100 according to the Embodiment 1-1.

In the optical ceramic material heat treatment apparatus 500, the first furnace body 501 and the second furnace body 502 include each a thermocouple 104. The thermocouples 104 are arranged such that their respective apical ends can reach the vicinity of synthetic silica glass mass S when it is arranged in the inside of the first furnace body 501 and the second furnace body 502.

The optical ceramic material heat treatment apparatus 500 includes a control unit 540. The control unit 540 includes a heat generation control unit for temperature rise 543 that controls the amount of heat generation of the temperature rise heaters 107 provided in the first furnace body, a flow rate control unit 541 that controls the flow rate of the refrigerant flowing in the inside of the second furnace body 502, and a heat generation upon temperature drop control unit 542 that controls the amount of heat generation of the temperature drop control heaters 117 provided in the second furnace body 502. The control unit 540 outputs control signal to at least one of the flow rate control unit 541 and the heat generation upon temperature drop control unit 542 based on the temperature of the vicinity of the synthetic silica glass mass S detected by the thermocouple 104 provided in the second furnace body 502. Based on it, at least one of the flow rate of the refrigerant and the amount of heat generation of the temperature drop control heaters 117 is adjusted to keep the temperature drop rate of the synthetic silica glass mass S in a predetermined profile.

In the optical ceramic material heat treatment apparatus 500, in case that the temperature of the synthetic silica glass mass S rises to a predetermined temperature and is kept at that temperature, the synthetic silica glass to be heat treated is arranged in the inside of the first furnace body 501 and the temperature is controlled by the heat generation upon temperature rise control unit 543. During the temperature of the synthetic silica glass mass S is to be dropped at a rate larger than a predetermined temperature drop rate, the synthetic silica glass mass S to be heat treated is moved from the first furnace body 501 to the second furnace body 502 and the temperature drop is controlled by at least one of the flow rate control unit 541 and the heat generation upon temperature drop control unit 542. That is, by adjusting at least one of the flow rate of the refrigerant and the amount of heat generation of the temperature drop control heaters 117, the temperature drop rate of the synthetic silica glass mass S is kept in the predetermined profile. With this operation, the temperature drop of the synthetic silica glass mass S can be controlled more accurately.

Note that to more accurately control the temperature drop rate of the synthetic silica glass mass S, it is preferred that the control unit 540 controls both the flow rate control unit 541 and the heat generation control unit 542, that is, the control unit 540 controls the flow rate of the refrigerant and the amount of heat generation of the temperature drop control heaters 117 simultaneously.

Figure 8:
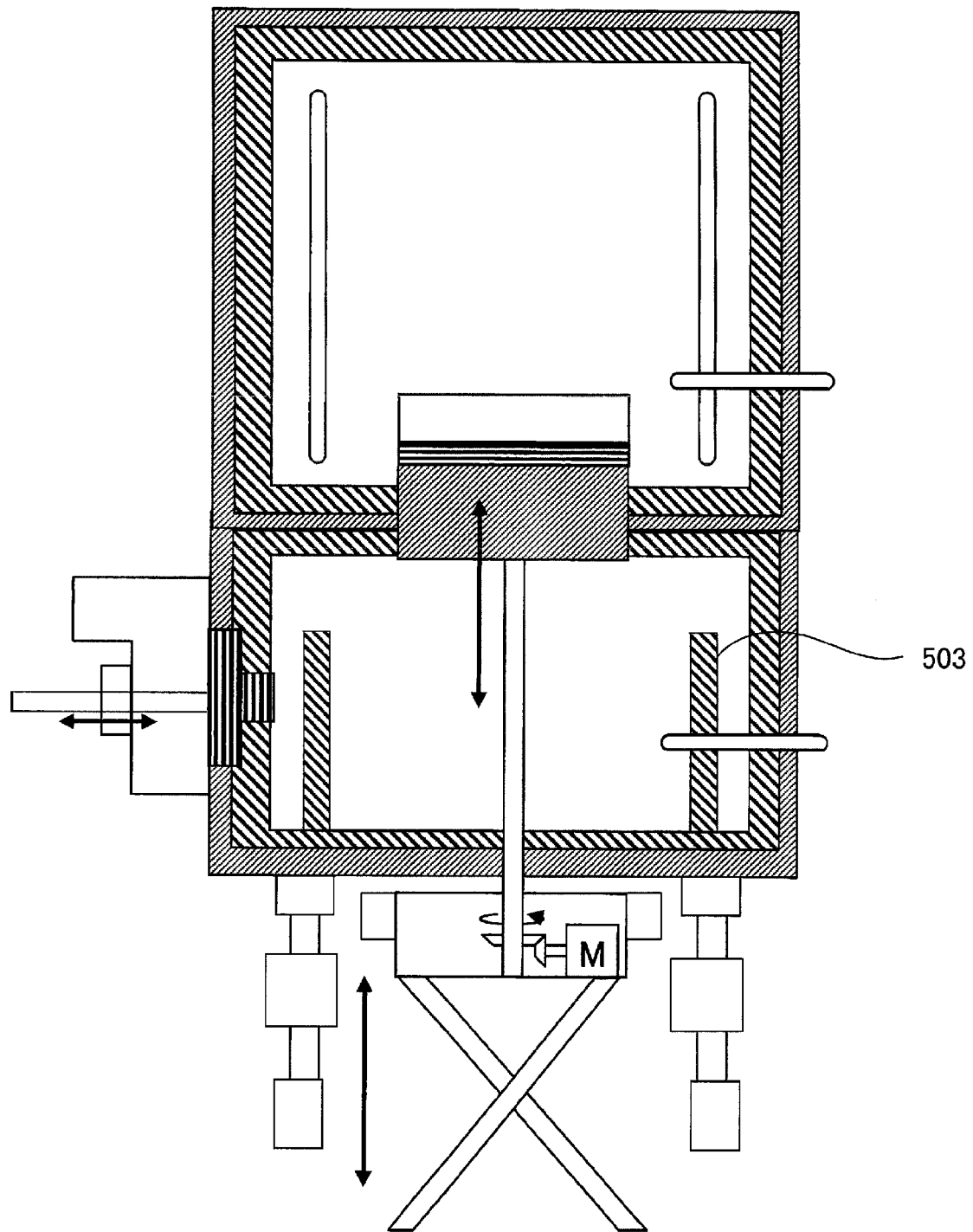
FIG. 8 is a cross-sectional view showing another configuration of an optical ceramic material heat treatment apparatus according to the Embodiment 1-5 of the present invention.

Also, a configuration may be adopted in which inside the second furnace body 502 of the optical ceramic material heat treatment apparatus 500, a wall portion 503 is provided. The wall portion 503 is similar to the wall portion 203 in the optical ceramic material heat treatment apparatus 200 according to the Embodiment 1-2. This configuration is shown in FIG. 8. By adopting this configuration, similarly to the case of the optical ceramic material heat treatment apparatus 200 according to the Embodiment 1-2, the refrigerant introduced from the refrigerant intake units 130 is prevented from directly winding the synthetic silica glass mass S, so that the temperature drop of the synthetic silica glass mass S can be controlled more accurately.

[Second Embodiment: Method for Heat Treating Synthetic Silica Glass]

Then, a second embodiment for carrying out the present invention is explained.

In the present embodiment, the optical ceramic material heat treatment apparatus 100 according to the Embodiment 1-1 is used. The stage 105 is descended to outside of the furnace body 101 by the stage movement device 120 in the elevation mechanism 126. Then, a synthetic silica glass mass S is set on the ring-formed jig 106 on the stage 105 as an optical ceramic material to be heat treated.

Then, the stage 105 is elevated by the elevation mechanism 126 to place the synthetic silica glass mass S in the inside of the furnace body 101. In that state, the stage 105 is rotated by the rotation mechanism 121, and the synthetic silica glass mass S rotates. In this state, based on the temperature of the vicinity of the synthetic silica glass mass S detected by the thermocouple 104, the synthetic silica glass mass S is heated by controlling the amount of heat generation of the temperature rise heaters 107. The heating is continued until the temperature of the vicinity of silica glass reaches a predetermined temperature between 1100° C. and 1200° C. (up to 1100° C. in the case of the second aspect) within which temperature range the temperature of the vicinity of the silica glass is higher than the strain point of the synthetic silica glass. The silica glass is kept in this state for a certain time. Note that in order to increase heat retention, the refrigerant intake valves 131 and the refrigerant release valve 109 are held closed during the step of rising temperature and holding. That is, the refrigerant is not introduced into the inside of the furnace body 101.

After holding at 1100° C. for a certain time, the process is switched over to the cooling step. In the cooling step, based on the temperature of the vicinity of the synthetic silica glass mass S detected by the thermocouple 104, at least one of the flow rate of the refrigerant and the amount of heat generation of the temperature drop control heaters 117 is controlled to keep the temperature drop rate of the synthetic silica glass mass S in the predetermined profile by keeping the temperature drop in a predetermined profile to keep the temperature of the synthetic silica glass mass S in a predetermined profile. In the cooling step, the refrigerant intake valves 131 and the refrigerant release valve 109 are opened to introduce the refrigerant from the refrigerant intake unit 130 into the furnace body 101. The refrigerant introduced into the furnace body 101 flows in the inside of the furnace body 101 from lower part to upper part and is released through the refrigerant release port 108. In this manner, by dropping the temperature in the inside of the furnace body 101, the synthetic silica glass mass S is cooled. Note that in the second embodiment, the flow rate control unit 141 and the heat generation control unit 142 of the control unit 140 control the cooling such that the cooling is performed to maintain the temperature drop rate at a rate of 70° C./hour or more within a temperature region of from 1100° C. to 700° C.

In the above-mentioned cooling step, by controlling the amount of heat generation of the temperature drop control heaters 117 by the heat generation control unit 142 and controlling the flow rate of the refrigerant by the flow rate control unit 41 simultaneously, the temperature drop rate in the vicinity of the synthetic silica glass mass S can be controlled more precisely. Note that the temperature rise heaters 107 also serves as the temperature drop control heaters 117 that controls output upon temperature drop.

Specific control of temperature drop rate is explained hereafter. Based on the predetermined temperature drop rate profile, set temperatures for predetermined time points are stored in the control unit 140. At each of the predetermined time points, the temperature of the vicinity of the synthetic silica glass mass S is detected by the thermocouple 104. The detected temperature is compared with the set temperature for that point. When the detected temperature is higher than the set temperature, the control unit 140 selects and performs one of controls (1) to (3) below.

(1) The heat generation control unit controls the output of the temperature drop control heaters 117 to be decreased and the flow rate control unit 141 controls the flow rate of the refrigerant to be increased.

(2) The flow rate control unit 141 controls the flow rate of the refrigerant to be kept at a constant level. On the other hand, the heat generation control unit 142 controls the temperature drop control heaters 117 such that its output is decreased.

(3) The heat generation control unit 142 controls the temperature drop control heaters 117 such that its output is kept constant and the flow rate control unit 141 controls the flow rate of the refrigerant to be increased.

In contrast, when the detected temperature is lower than the set temperature, the control unit 140 selects and performs one of controls (4) to (6) below.

(4) The heat generation control unit 142 controls the output of the temperature drop control heaters 117 to be increased. On the other hand, the flow rate control unit 141 controls the flow rate of the refrigerant to be decreased.

(5) The flow rate control unit 141 controls the flow rate of the refrigerant to be kept constant. On the other hand, the heat generation control unit 142 controls the temperature drop control heaters 117 such that its output is increased.

(6) The heat generation control unit 142 controls the temperature drop control heaters 117 such that its output is kept constant. On the other hand, the flow rate control unit 141 controls the flow rate of the refrigerant to be decreased.

After the cooling step is completed, the rotation of the stage 105 by the rotation mechanism 121 is stopped. The stage 105 is descended by the elevation mechanism 126 and the synthetic silica glass mass S is taken out from the lower part of the furnace body 101. By the above steps, the synthetic silica glass mass S having a maximum value of birefringence of 5 nm/cm or more is obtained.

With any of the optical ceramic material heat treatment apparatuses according to Embodiments 1-2 to 1-5 other than the Embodiment 1-1, in the same manner as described above, the heat treatment of the synthetic silica glass mass S can be performed by keeping the temperature drop temperature in a predetermined profile. For example, the synthetic silica glass mass can be heat treated by cooling it by maintaining it at a temperature drop rate of 70° C./hour or more within a temperature region of from 1100° C. to 700°

C. This produces a synthetic silica glass mass S having a maximum value of birefringence of 5 nm/cm or more.

[Third Embodiment: Method for Producing an Optical System and Method for Producing an Exposure Apparatus]

The synthetic silica glass mass S obtained by the heat treatment method for synthetic silica glass explained as the second embodiment is subjected to processing of grinding, slicing, chamfering, polishing and the like as appropriate to obtain a lens having a predetermined size. The lens thus produced has a maximum value of birefringence of 5 nm/cm or more.

Figure 9:
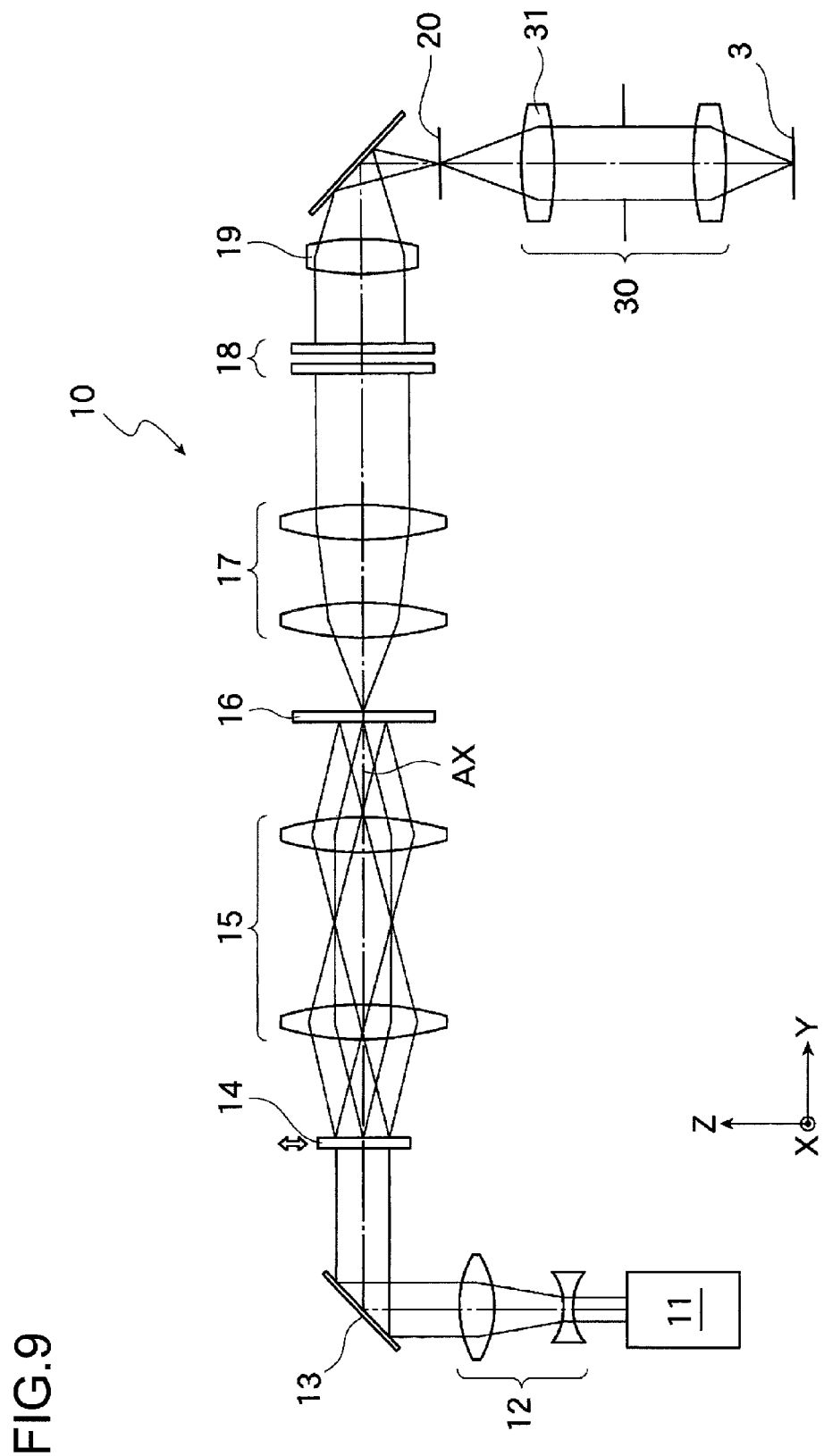
FIG. 9 is a schematic configuration drawing showing an optical system of an exposure apparatus according to a third embodiment of the present invention.

A method for producing an optical system of an exposure apparatus by combining a lens having a relatively large maximum value of birefringence with a lens having a relatively small maximum value of birefringence is explained with reference to the attached drawings. FIG. 9 shows the configuration of an exposure apparatus. The lens 31 having a relatively large value of birefringence is combined with other lenses having relatively small values of birefringence to constitute a projection optical system 30. On this occasion, these lenses are combined with each other such that birefringence is canceled by taking account of direction and magnitude of birefringence of each of the lenses. As a result, the birefringence of the projection optical system 30 as a whole can be decreased. By incorporating the projection optical system 30 thus constituted, the exposure apparatus 10 is produced.

Then, canceling of birefringence is specifically explained. Distribution of signed birefringence values of a plurality of optical components is obtained. The optical components include those optical components obtained by processing the synthetic silica glass heat treated by the heat treatment method for synthetic silica glass according to the second embodiment of the present invention. Based on the values, the signed birefringence of the optical system in whole is calculated. The distribution of signed birefringence value of each optical component and combination of each optical component is determined such that the distribution of the signed birefringence value of the optical system in whole does not exceed a predetermined value to constitute a projection optical system of an exposure apparatus. As the production method for such a projection optical system and exposure apparatus, for example, the method described in the pamphlet of International Publication WO00/041226 may be adopted.

Hereafter, an outline of an exposure apparatus 10 that includes a projection optical system 30 produced by the above-mentioned production method for an optical system is explained with reference to FIG. 9.

The exposure 10 according to the present embodiment, as shown in FIG. 9, is an apparatus that exposes a wafer to light through a pattern of a mask 20 and includes a light source 11, a beam expander 12, a folding mirror 13, a diffraction optical element 14, an afocal zoom lens 15, a diffraction optical element 16, a zoom lens 17, an integrator optical system 18, a condenser optical system 19, a mask 20, a projection optical system 30, an optical substrate 3 and the like.

In the exposure apparatus 10 so constituted, the projection optical system 30 has a function of collecting light flux that passes through the pattern of the mask 20 and forms an image of mask pattern on the wafer 3. By performing one-shot exposure or scanning exposure of a wafer 3 to light through a mask pattern while two-dimensionally driving and controlling the wafer 3 in a plane (X-Y plane) orthogonal to the light axis AX of the projection optical system 30, the pattern of the mask 20 is transferred in an exposure region of the wafer 3.

As explained above, according to the optical ceramic material heat treatment apparatus, the optical ceramic material heat treatment method, and a heat treatment method for heat treating synthetic silica glass according to the present invention, at least one of the amount of heat generation of the temperature drop control heater and the flow rate of the refrigerant in the inside of the furnace body is controlled to make it possible to perform more accurately the control of temperature drop of the optical ceramic material or in the vicinity thereof.

By producing the optical system 30 and the exposure apparatus 10 by using the optical ceramic material such as synthetic silica glass or the like obtained with the above explained apparatus and method, it becomes possible to produce the optical system 30 and the exposure apparatus 10 having more excellent performance.

The above explanation relates to a method for producing a projection optical system of an exposure apparatus and a method for producing an exposure apparatus using it. However, the method for producing an optical system according to the third aspect of the present invention may be applied to an illumination optical system but is not limited to a projection optical system. The illumination optical system is an optical system between the light source 11 and the mask 20 in the exposure apparatus 10. In recent years, as a light source having a shorter wavelength light is increasingly used, calcium fluoride single crystal is sometimes used as a material for optical components such as lenses or the like that constitute an illumination optical system. Lenses made of calcium fluoride single crystal has birefringence with a specified sign. Since the synthetic silica glass produced by the heat treatment method according to the second embodiment of the present invention has birefringence having a sign different from that the birefringence of calcium fluoride single crystal has, it is possible to cancel birefringence by combining them. By constituting the illumination optical system in this manner and incorporating it in an exposure apparatus, the performance of the exposure apparatus can be improved.

The embodiment explained above is described for ease of understanding the present invention and should not be construed as limiting the present invention.

In the above embodiment, explanation has been made taking synthetic silica glass as an example of the optical ceramic material. Examples of the synthetic silica glass include synthetic silica glasses that have been subjected to a predetermined treatment such as those doped with fluorine.

The optical ceramic material to be heat treated in the present invention may be amorphous materials other than synthetic silica glass, or a single crystal material. Examples of these include in addition to general optical glasses, calcium fluoride, barium fluoride, sapphire, various types of cubic granite, cubic spinel, cubic perovskite, and so on.

Moreover, in the optical ceramic material heat treatment apparatus explained as the first embodiment of the present invention, the furnace body has an approximately cylindrical form. However, the heat treatment apparatus according to the present invention is not limited thereto and the furnace body may have a different form, for example, a rectangular parallelepiped form or the like.

Moreover, in the optical ceramic material heat treatment apparatus explained as the Embodiment 1-2, the partition wall portion that partitions the inside of the furnace body into an inner space and an outer space is made of a glass fiber refractory that includes silica glass fiber or the like. However, the present invention is not limited thereto and the wall portion may be made of other refractories.

Moreover, in the optical ceramic material heat treatment apparatus explained as the first embodiment of the present invention, SiC heaters are used as the temperature rise heaters and the temperature drop control heaters. However, the present invention is not limited thereto and other types of heaters may also be used.

Moreover, in the optical ceramic material heat treatment apparatus explained as the first embodiment of the present invention, the temperature rise heaters and the temperature drop control heaters arranged in the inside of the furnace body are arranged at equal intervals on a virtual cylindrical surface having a common center with the furnace body. However, the present invention is not limited thereto and a suitable number of heaters may be arranged at suitable locations. Also, in the optical ceramic material heat treatment apparatus explained as the Embodiment 1-2 according to the present invention, which is of the type that has a wall portion, the temperature rise heaters and/or temperature drop control heaters may be arranged in the outer space instead of then inner space.

Moreover, in the optical ceramic material heat treatment apparatus explained as the first embodiment of the present invention, the refrigerant intake units are arranged in the lower part of the furnace body. However, the location of the refrigerant intake unit is not limited thereto. For example, the refrigerant intake unit may be provided on a lateral side or an upper side of the furnace body and in conformity with this, the refrigerant release port 108 may be arranged on the side of the furnace body or the like. Also, the furnace body may be of a type that is hermetically sealed. Alternatively, the furnace body may be of a type that is not hermetically sealed but is capable of releasing the refrigerant through a gap of the furnace body. In the case of the furnace body of the type that is not hermetically sealed, it may have a configuration having no refrigerant release port.

Moreover, in the embodiment 1-2 according to the present invention, the wall portion is configured such that it is fixed to the bottom wall so as to cover the inner space without gaps and in the upper part, the inner space and the outer space communicate with each other. However, the present invention is not limited thereto and the wall portion may have a gap. Also, a configuration may be adopted that the inner space and the outer space are completely separated from each other by the wall portion.

Moreover, in the optical ceramic material heat treatment apparatus explained as the first embodiment of the present invention, when nitrogen gas and/or inert gas is used, a configuration is adopted in which a piping is provided that feeds the refrigerant from a refrigerant storage tank or the like to the inside of the furnace body.

Moreover, in the optical ceramic material heat treatment apparatus explained as the first embodiment of the present invention, a thermocouple is used as the sensor for temperature detection. However, the present invention is not limited thereto. The sensor may be any temperature sensor so far as it can detect the temperature of an optical ceramic material to be heat treated directly or indirectly depending on various conditions.

(Embodiment 2-1)

Hereafter, explanation is made on an embodiment of the heat treatment method for heat treating synthetic silica glass conducted by using the optical ceramic material heat treatment apparatus 100 that is explained as Embodiment 1-1 as shown in FIG. 1.

First, synthetic silica glass mass S to be heat treated is placed on the ring-formed jig 106 made of silica glass. The temperature rises up to 1100° C. in 12 hours and held at 1100° C. for 10 hours. Then, the refrigerant release valve 109 and the refrigerant intake valves 131 are opened simultaneously. Next, air as the refrigerant is introduced from the outside of the furnace body 101 into the inside of the furnace body, and controlling of the temperature drop rate by the control unit 140 is started. That is, to establish a preset constant temperature drop rate, the amount of heat generation of the temperature drop control heaters 117 and the flow rate of the refrigerant in the inside of the furnace body are controlled. The air introduced in the inside of the furnace body 101 flows from the lower part to the upper part of the furnace body and is continuously released through the refrigerant release port 108. When the detected temperature detected by the thermocouple of the vicinity of the synthetic silica glass mass S reaches 700° C., the control by the control unit 140 is stopped. Then, the synthetic silica glass mass S is cooled until the detected temperature of the vicinity of the synthetic silica glass mass S detected by the thermocouple reaches approximately room temperature. Thereafter, the synthetic silica glass mass S is taken out from the furnace body 101.

As already explained above, the temperature drop rate is controlled by storing in the control unit 140 set temperatures for each of the predetermined time points based on a predetermined temperature drop rate profile and comparing the a set temperature with a temperature of the vicinity of the synthetic silica glass mass S detected by the thermocouple 104 for each of the predetermined time points. It is desirable that the temperature detected by the thermocouple 104 is controlled to be within the range of ±5° C. with respect to the set temperature for each predetermined time points.

Figure 10:
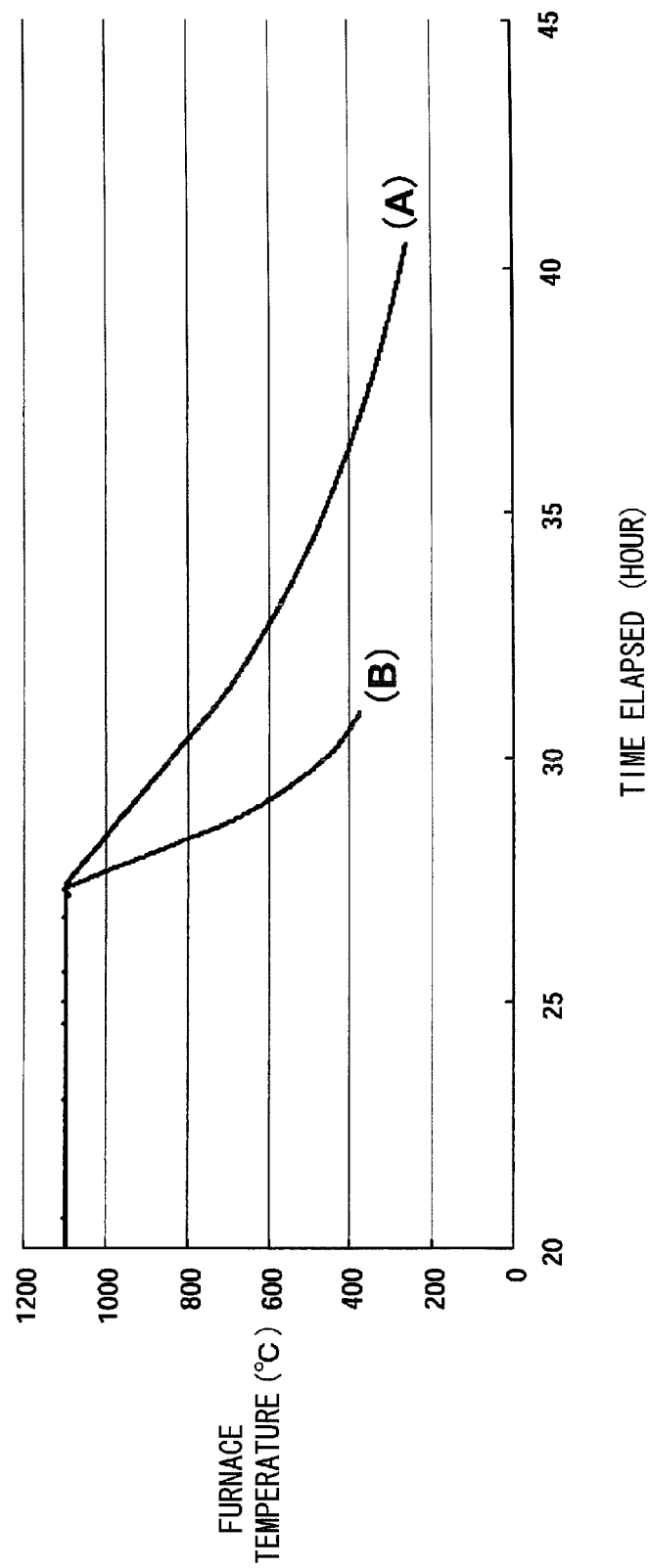
FIG. 10 is a graph showing measured values of temperature change in the vicinity of the synthetic silica glass mass S in the method for heat treating the synthetic silica glass according to a second embodiment of the present invention.

FIG. 10 shows measured values of temperature change of the vicinity of the synthetic silica glass mass S upon temperature drop in the Embodiment 2-1. "(A)" shows a result when the temperature drop rate is set to 100° C./hour, and (B) shows a result when the temperature drop rate is set to 300° C./hour. It is apparent that in either one of the temperature drop rates, the temperature drop rate is controlled accurately in the temperature range of from 1100° C. to 700° C. where the birefringence of synthetic silica glass could be influenced. The maximum value of birefringence of synthetic silica glass mass S after the heat treatment is 5 nm/cm or more.

With the optical ceramic material heat treatment apparatus explained as the first embodiment of the present invention, heat treatment can be performed at a temperature drop rate of 70° C./hour or more within the temperature range of from 1100° C. to 700° C., thereby synthetic silica glass mass having a maximum value of birefringence of 5 nm/cm or more can be obtained. By processing such a synthetic silica glass mass, an optical component such as a lens having a relatively great maximum value of birefringence can be obtained. Also, by performing heat treatment at a relatively high temperature drop rate above 100° C./hour in the temperature range of from 1100° C. to 700° C., a synthetic silica glass mass having a maximum value of birefringence of 5 nm/cm or more, for example, 10 nm/cm or more, even 20 nm/cm or more. Also, even in the region where the temperature drop rate is large, the temperature drop rate can be controlled to be at the predetermined value accurately, so that it is possible to produce synthetic silica glass mass having a small error with respect to the predetermined birefringence value.

Various embodiments and variations have been explained above. However, the present invention is not limited thereto.

What is claimed is:

1. An optical ceramic material heat treatment apparatus, comprising:
   a furnace body configured to contain an optical ceramic material to be heat treated in the inside thereof;
   a wall portion configured to partition the inside of the furnace body into an inner space and an outer space;
   a temperature drop control heater configured to generate heat to control a temperature drop rate during dropping a temperature of the optical ceramic material to be heat treated;
   a refrigerant intake unit configured to introduce a refrigerant into the outer space of the furnace body to flow the refrigerant therein; and
   a control unit configured to control the temperature drop rate,
   wherein the temperature drop control heater is arranged in the inside of the furnace body,
   the control unit is configured to control at least one of an amount of heat generation of the temperature drop control heater, and a flow rate of the refrigerant in the inside of the furnace body to control a temperature drop rate at the optical ceramic material to be heat treated or in the vicinity thereof to be kept in a predetermined profile that is based on the optical ceramic material,
   the optical ceramic material to be heat treated is arranged in the inner space,
   the furnace body comprises a first furnace body and a second furnace body that are arranged in contact with each other in a vertical direction or in a horizontal direction,
   the temperature drop control heater is provided in the inside of the second furnace body,
   the refrigerant intake unit is installed to the second furnace body, and
   in the inside of the first furnace body, a heater configured to raise the temperature of the optical ceramic material to be heat treated is provided.

2. The optical ceramic material heat treatment apparatus according to claim 1, wherein the control unit is configured to control both the amount of heat generation of the temperature drop control heater and the flow rate of the refrigerant in the inside of the furnace body.

3. The optical ceramic material heat treatment apparatus according to claim 1, further comprising a flow rate control unit configured to control the flow rate of the refrigerant that flows in the inside of the furnace body.

4. The optical ceramic material heat treatment apparatus according to claim 1, wherein the temperature drop control heater is also configured to be a temperature rise heater during raising the temperature of the optical ceramic material to be heat treated.

5. The optical ceramic material heat treatment apparatus according to claim 1, wherein the temperature drop control heater is arranged in the inner space.

6. The optical ceramic material heat treatment apparatus according to claim 1, wherein the wall portion extends in a substantially vertical direction.

7. The optical ceramic material heat treatment apparatus according to claim 1, wherein the refrigerant is at least one of air, nitrogen gas, inert gas, and mixtures thereof.

8. The optical ceramic material heat treatment apparatus according to claim 1, wherein the refrigerant is a liquid.

9. The optical ceramic material heat treatment apparatus according to claim 1, wherein the refrigerant intake unit is arranged on the lower part of the furnace body.

10. An optical ceramic material heat treatment method using the optical ceramic material heat treatment apparatus according to claim 1, the method comprising:
    heating an optical ceramic material to be heat treated to a predetermined temperature in a first temperature range and holding at the first temperature range for a predetermined time; and
    performing heat treatment by cooling the heated optical ceramic material at a temperature drop rate larger than a predetermined temperature drop rate.

11. An optical ceramic material heat treatment method using the optical ceramic material heat treatment apparatus according to claim 1, the method comprising:
    heating an optical ceramic material to be heat treated to a predetermined temperature between 1000° C. and 1200° C. and holding the optical ceramic material at the predetermined temperature for a predetermined time, and
    performing heat treatment by cooling the heated optical ceramic material at a temperature drop rate larger than 70° C./hour.

12. The heat treatment method for heat treating a synthetic silica glass according to claim 11, wherein the heat treated synthetic silica glass has a maximum value of birefringence of 5 nm/cm or more.

13. A production method for producing an optical system, the method comprising:
    providing a synthetic silica glass having a maximum value of birefringence of 5 nm/cm or more by the heat treatment method for heat treating the synthetic silica glass according to claim 12;
    processing the heat treated synthetic silica glass to obtain an optical component; and
    constituting an optical system including a plurality of optical components that include the obtained optical component.

14. A production method for producing an exposure apparatus, the method comprising:
    producing an illumination optical system and/or a projection optical system by the production method for producing an optical system according to claim 13; and
    incorporating the produced illumination optical system and/or the produced projection optical system to constitute the exposure apparatus.

* * * * *